Dec. 16, 1969    T. N. THIELE    3,484,652
PROTECTION OF A PULSE MODULATED POWER SYSTEM
Filed July 17, 1967
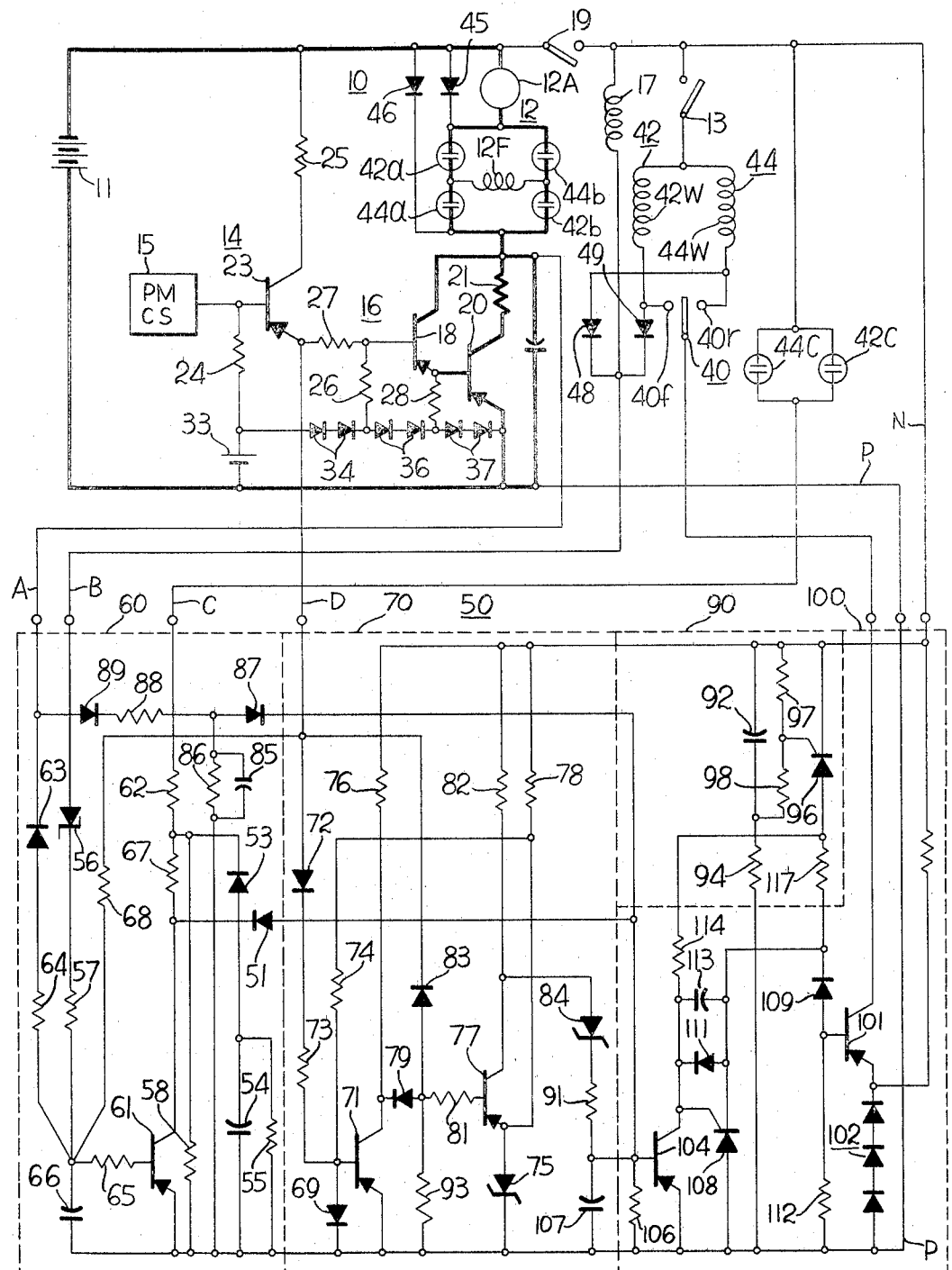
Inventor
Tom N. Thiele
by R. J. Falkowski
Attorneys United States Patent Office 3,484,652
Patented Dec. 16, 1969

3,484,652
PROTECTION OF A PULSE MODULATED
POWER SYSTEM
Tom N. Thiele, Milwaukee, Wis., assignor to Allis-Chalmers Manufacturing Company, Milwaukee, Wis.
Filed July 17, 1967, Ser. No. 653,777
Int. Cl. H02h 3/28, 7/00, 3/18
U.S. Cl. 317—31                                              10 Claims

ABSTRACT OF THE DISCLOSURE

A direct current power system has a pulse modulation control system controlling a power transistor switching circuit that cylically energizes a motor from a direct current source. A protective system is connected to the power system to sense selected circuit conditions and deactivate the power system upon the occurrence of a fault or failure in the power switching circuit. The protective system senses the voltages at the output and the input of the switching circuit; the position of a direction selecting switch; and the energization of direction contact relays to determine certain operating voltages in the switching circuit. These voltages are received by a power switch failure detection means that evaluates the switching circuit voltages, normal energization of the power system, the position of the direction selecting switch, and the occurrence of a normally momentary voltage drop in the source; and by a bias and level detection means that measures the operating voltages to the switching circuit. A transistor switching circuit is connected in the circuit of the direction selecting switch to open the selecting switch circuit in response to a fault indicating output from either the power switch failure detection means or the bias and drive level detection means.

---

This invention relates to protective systems, particularly to protective systems for protecting the components of a pulse modulation control and power system that controls the energization of a direct current motor from a direct current source through a semiconductor switch.

Pulse modulation control systems are used to control power to a direct current motor from a direct current source. In most applications of such systems, it is desirable to provide a fault detection system that senses selected system conditions and deenergizes the power system upon the occurrence of a fault or failure. Appropriate deenergization prevents damage to the components of the system.

According to this invention, means are provided for sensing selected cnoditions of the switching circuit of the power system to deactivate the system upon the sensing of an abnormal condition.

The figure is a schematic drawing of a direct current electrical power system that controls a direct current motor from a direct current source and having a protective system according to this invention.

Referring to the figure, a basic pulse modulated electrical power system 10 comprises a battery 11, a motor 12 having an armature winding 12A and a field winding 12F, a semiconductor power switching means such as a power transistor switching circuit 16 for periodically connecting battery 11 to motor 12, and a pulse modulation control system 14 for controlling switching circuit 16. Pulse modulation control system 14 may be of any known type that produces varying duration on-off pulses that are applied to cyclically turn a power switch on and off and thereby control the effective average voltage applied to a direct current motor.

Transistor switching circuit 16 comprises a driver transistor 18 and a power transistor 20 connected in a modified Darlington configuration with a small resistor 21 connected, as shown, between the collectors of transistors 18 and 20. A control transistor 23, which is functionally the last stage of pulse modulation control system 14, is turned on and off by the preceding controlling portions of control system 14, shown as a pulse modulation control section 15, to apply a signal across a resistor 24 to the base of transistor 23. Transistor 23 provides an input signal at its emitter for switching circuit 10. When the base of transistor 23 is negative, it turns on and current flows from the positive terminal of battery 11 through the emitter-base of transistor 20, the emitter-base of transistor 18, an input resistor 27, the emitter-collector of transistor 23, and a collector resistor 25 to fully turn on transistors 18 and 20. With transistors 18 and 20 turned on current flows through their emitter-collector circuits and motor 12 is thereby cyclically energized in response to the input applied from pulse modulation control system 14.

To insure that transistors 23, 18 and 20 have a minimum leakage current when turned off, control system 14 includes a reverse bias means, shown exemplary as a bias battery 33, that is connected to reverse bias transistor 23 across a pair of diodes 34 through resistors 24 and 27 and a resistor 26 and to reverse bias switching circuit 16 by reverse biasing transistor 18 across a pair of diodes 36 through resistor 26 and a resistor 28 and by reverse biasing transistor 20 across a pair of diodes 37 through resistor 28.

A means for controlling the direction of motor rotation is provided by a direction selecting switch 40 connected to apply electrical energy to either a forward relay 42 through a contact 40f or a reverse relay 44 through a contact 40r. Relay 42 comprises a coil or winding 42w and contacts 42a, 42b and 42c that are closed when winding 42w is energized by the closing of contact 40f. Similarly, relay 44 comprises a coil or winding 44w and contacts 44a, 44b and 44c that are closed when winding 44c is energized by the closing of contact 40r. Switch 40 is positioned to energize either the forward or reverse relay to select the direction of current through field winding 12F by controlling contacts 42a, 42b, 44a and 44b and thereby control the direction of rotation. A diode 45 is connected across the armature and a diode 46 is connected across the series connected armature and field winding to provide a path for motor induced currents during the periods that switching circuit 16 is turned off.

An operating switch 13 is connected between windings 42w and 44w and the negative terminal of the battery. Switch 13 is a switch associated with a control device (not shown) that controls the pulse modulation control system to determine the proportion of "on" time of switching circuit 16. When the control device is set to a zero or no power condition this removes the "on" signal to power switch 16 and also opens operating switch 13.

A condition responsive protective system 50 is connected to appropriate portions of electrical power system 10. Generally, protective system 50 comprises four circuits: a power switch failure detection means 60, a drive and bias level detection means 70, a time delay means 90, and a deactivating means 100. (These means are generally segregated by dashed lines in the drawing.) Upon the occurrence of a failure in power system 10, deactivating means 100 disconnects direction selecting switch 40 from the power source, battery 11, to thereby deenergize winding 42w or 44w and open the contacts of relays 42 and 44 to deenergize the power system. After deenergization, the power system and protection system may be reactivated by the opening and reclosing of a switch 19.

TIME DELAY MEANS

In normal operation, the control and protective systems are activated by connection to battery 11 through the closing of switch 19. The closing of switch 19 does not produce an immediate electrical response in the system and momentary low voltages occur that appear as system faults to protective system 50. To prevent response to these momentary conditions, time delay means 90 delays the operation of the protective system for a short period, on the order of 100 to 250 milliseconds, after energization of the power system as by the closing of switch 19.

Time delay means 90 comprises a thyristor 96, a charging or timing circuit comprising a capacitor 92 and a resistor 94 selected to charge capacitor 92 at a preselected rate, and a resistor 97 and resistor 98 connected to provide a voltage divider for selecting the portion of the voltage across capacitor 92 that is applied to the gate of thyristor 96. When the voltage across capacitor 92 reaches a preselected level, thyristor 96 turns on and the source voltage appears across the voltage divider made up of thyristor 96, resistor 117, a diode 109, and a resistor 112 between a positive conductor P connected to the positive terminal of battery 11 and a negative conductor N connected to the negative terminal of battery 11 through switch 19. Resistors 112 and 117 are selected to provide appropriate biasing to turn on a switching means such as a switching transistor 101 in deactivating means 100 when thyristor 96 is turned on.

DEACTIVATING MEANS

Switching transistor 101 has its emitter-collector circuit connected in series with biasing diodes 102 and direction selecting switch 40 in power system 10 and, after activation by time delay means 90, operates to control energization and deenergization of relay 42 or 44 when selecting switch 40 and operating switch 13 are closed. A control transistor 104 is connected to receive several control inputs that provide failure signals across a resistor 106 and a capacitor 107 from failure detection means 60 and level detection means 70 to turn on when its base becomes negative relative to its emitter. When transistor 104 is turned on, its collector is substantially directly connected to positive conductor P through its collector-emitter as the source voltage appears across a resistor 114 through thyristor 96. The turning on of transistor 104 makes the gate of a thyristor 108 positive relative to its cathode and thyristor 108 turns on. The turning on of thyristor 108 turn off transistor 101 by disconnecting the base of transistor 101 from the negative potential at conductor N by reverse biasing diode 109. This removes the forward biasing base-emitter voltage as the base of transistor 101 is connected to conductor P through resistor 112. A diode 111 is connected between the gate and cathode of thyristor 108 to clamp the collector voltage of transistor 104 to the voltage at the cathode of diode 109 and a capacitor 113 is connected to a bypass spurious pulse that may appear across thyristor 108.

POWER SWITCH FAILURE DETECTION MEANS

Power switch failure detection means 60 comprises a switching circuit voltage sensing means responsive to the switching circuits input and output voltages for indicating a switching circuit failure, a deenergization sensing means responsive to the energization of the power system for preventing erroneous failure indications during normal operational deenergization of the power system, an interlock delay means instantaneously responsive to operational deenergizing as by the opening of the direction selecting switch for preventing erroneous failure indications resulting from the time required to open relay contacts, and a loading transient suppression means responsive to the switching means output voltage and to momentary positive voltage pulses that occur in the power system for preventing erroneous fault indications resulting from the connection of high transient loads to the power source.

Failure detection means 60 responds to a failure indicated by the switching circuit voltage sensing means by producing a failure signal that turns off a transistor 61 by removing the negative forward bias from its base. The turning off of transistor 61 turns on transistor 104 by applying a negative forward bias to its base through a diode 51 as the source voltage, appearing between a conductor C and conductor P, appears across a voltage divider made up of a resistor 67 and a resistor 58 making the base of transistor 104 negative relative to its emitter through a resistor 62 across resistor 106. The turning on of transistor 104 turns off transistor 101. A diode 53 and a parallel R-C circuit utilizing a capacitor 54 and a resistor 55 are connected to the voltage divider to prevent the turning off of transistor 61 for a short time after opening or closing of contacts 42c and 44c. A capacitor 66 is connected between the base and emitter of transistor 61 to absorb momentary pulses that occur when power switch 16 turns on or off.

The switching circuit voltage sensing means is responsive to the switching circuit input and output voltage and detects failures in switching circuit 16 essentially by responding to the input voltage of the switching circuit at the emitter of transistor 23, which is supplied to protective system 50 by a conductor D, and to the output voltage of the switching circuit at the collector of transistor 18, which is supplied by a conductor A. During normal operation with power switch 16 turned off in its cycle of operation, the voltage of conductor D is positive relative to positive conductor P and the voltage of conductor A is negative relative to conductor P; and with power switch 16 turned on in its cycle of operation, the voltage of conductor D is negative and the voltage of conductor A is at essentially zero potential. In either of these normal conditions at least one of these signals is negative and keeps transistor 61 turned on as current flows through a blocking diode 63, a resistor 64, and a base resistor 65 through the base-emitter of transistor 61 to positive conductor P; or as current flows through the base-emitter of transistor 61, base resistor 65, and a resistor 68. If both signals are zero or positive, transistor 61 is turned off.

The deenergization sensing means is responsive to normal deenergization of the power system that occurs when selecting switch 40 is open to place the power system in "neutral" or when operating switch 13 is open to stop power flow. The opening of either of these switches deenergizes winding 42w or 44w to open contacts 42c and 44c and make the voltage sensing means inoperative. Contacts 42c and 44c are added to relays 42 and 44 to connect negative conductor N by means of conductor C to failure detection means 60 only when switch 40 is closed and either relay 42 or 44 is energized. The opening of contacts 42c and 44c deactivates the voltage sensing means by removing the negative bias available from this portion of the circuit for the base of transistor 104 regardless of the bias condition of the base-emitter of transistor 61 and thereby prevents the turning on of transistor 104.

This means is necessary because with contacts 42a, 42b, 44a and 44b open, the potential at the collector of power switch 16 is zero relative to conductor P because it is not connected to the power source and the potential at the emitter of transistor 23 is positive relative to conductor P because of the reverse basing effect of bias battery 33. Therefore, neither conductor A or D is negative and transistor 61 would otherwise turn off as if a fault condition were present.

The interlock delay means is instantaneously responsive to the opening of selecting switch 40 or operating switch 13 and operates to disregard instantaneous failure indicating signals by sensing the voltage at contacts 40f and 40r. When either switch, 40 or 13, is open the voltage sensing means is deactivated by forward biasing transistor 61 by connecting the base of transistor 61 to negative conductor N through resistor 65, a resistor 57, a Zener diode 56, a conductor B and a relay winding 17 that controls other contacts (not shown) in the system. With selecting switch 40 and operating switch 13 closed, there is no negative potential at conductor B because conductor B is connected to positive conductor P through transistor 101, diodes 102 and a diode 48 or 49. This prevents false operation that occurs because of the time lag between the opening of switch 40 and the opening of contacts 42a, 42b, 44a, 44b, 42c and 44c.

The loading transient suppression means is responsive to the output voltage of the switching circuit and momentarily deactivates the deactivating means when transient positive pulses occur in the power system. These transient positive pulses occur in the circuitry when high transient loads are connected to the battery causing instantaneous, momentary battery voltage dips. The transient suppression means comprises a diode 89, a resistor 88, a diode 87, and a parallel R-C circuit made up of a resistor 86 and a capacitor 85. When these transient positive pulses occur at conductor A and switching circuit 16 is turned off in its normal cycle of operation by the removal of drive current, the normal negative voltage does not appear at conductor A and transistor 61 would turn off. To prevent this, the positive potential from the pulse at conductor A is applied to the base of control transistor 104 through diode 89, resistor 88 and diode 87 to charge capacitor 85 across resistor 86. When switching circuit 16 turns off, capacitor 85 discharges at a selected rate through resistor 86 to keep transistor 104 turned off for a time selected to extend over several cycles of operation of the modulation control system.

DRIVE AND BIAS LEVEL DETECTION MEANS

Drive and bais level detection means 70 provides means for evaluating the input voltages to switching circuit 16 when it is turned on and off by measuring the voltage at the emitter of transistor 23. The operating voltages are evaluated by measuring the forward drive voltage across the input circuit of switching circuit 16 when it is in an on condition and by measuring the reverse biasing voltage across the input circuit of switching circuit 16 when it is in an off condition. With normal operation and switching circuit 16 "on," the emitter of transistor 23 should be negatitve at a known level, for example, at —5 volts. With normal operation and switching circuit 16 "off," the emitter should be positive at a known level, for example, at +2.9 volts. By appropriately selecting the component values, the protective system operates to turn off the power system at any desired inadequate input voltage level, such as, for example, when the "on" voltage at the emitter of transistor 23 drops to a level more positive than —3 volts and if the "off" voltage drops to a level more negative than +2.1 volts.

To measure the "off" condition of switching circuit 16, the positive voltage at the emitter of transistor 23 is applied through conductor D to the base of the transistor 71 across a diode 69 at a level determined by a voltage divider made up of a resistor 73 and a resistor 74 as current flows from conductor D through a diode 72, resistor 74, and a resistor 78 to conductor N. A Zener diode 75 maintains one end of the voltage divider connected to the emitter of a transistor 77 at a selected reference voltage. The resistances of resistors 73, 74 and 78 are selected to forward bias transistor 71 through resistors 78 and 74 when the positive voltage at conductor D drops below the preselected level, that is, for example, +2.1 volts. When transistor 71 is forward biased and turned on, the source voltage appears across a resistor 76, and the base of transistor 77 is connected to positive conductor P through a base resistor 81 and a resistor 93. This reverse biases diodes 79 and 83 and transistor 77 is turned off. The turning off of transistor 77 connects the base of control transistor 104 to negative conductor N through a resistor 82, a Zener diode 84, and a resistor 91. Transistor 104 then turns on to turn off switching transistor 101.

To measure the "on" condition of switching circuit 16, the negative voltage at the emitter of transistor 23 is applied through conductor D to the base of transistor 77 through diode 83 and resistor 81. If the negative voltage is more negative than the preselected level, that is, for example, —3 volts, determined primarily by the breakover voltage of Zener diode 75, transistor 77 is kept on as current flows from conductor D through diode 83, base resistor 81, the base-emitter of transistor 77, and Zener diode 75. If the input voltage at conductor D drops below the voltage across Zener diode 75 and the diode drop of diode 83, current ceases and transistor 77 turns off if transistor 71 has not been turned off by sufficient positive voltage.

In describing the invention, the preferred embodiment has been shown and described, but it is obvious to one skilled in the art that there are many variations, combinations, alterations and modifications that may be made without departing from the spirit of the invention.

The embodiments of the invention in which an exclusive property or priviledge is claimed are defined as follows:

1. A protective system for an electrical power system having a direct current load energized by a direct current source through a semiconductor power switching means controlled by a pulse modulation control system that cyclically turns said switching means on and off, said protective system comprising:

a voltage sensing means responsive to the input voltage and the output voltage of the power switching means to produce a failure signal if one of said voltages is not of a preselected polarity;

detection means responsive to the input voltage of the power switching means when the power switching means is turned on to produce a failure signal when said voltage is below a preselected level; and deactivating means connected to receive and responsive to the failure signals for deenergizing the power system upon the occurrence of a failure signal.

2. A protective system according to claim 1 wherein said semiconductor power switching means includes a power transistor and a driver transistor for said power transistor and said input voltage appears at the base of said driver transistor and said output voltage appears at the collector of said power transistor.

3. A protective system according to claim 1 and including means for reverse biasing said semiconductor power switching means when said switching means is turned off and wherein said detection means responsive to the input voltage of said power switching means when said switching means is turned on produces a failure signal when said input voltage is below a preselected level at a polarity to turn on said switching means, and said detection means is also responsive to said input voltage when the switching means is turned off to produce a failure signal when said input voltage during said off condition is below a preselected level at a polarity to turn off said switching means.

4. A protective system according to claim 3 also comprising deenergization sensing means responsive to the normal deenergization state of the power system load for deactivating the voltage sensing means during said normal deenergization, and interlock means instantaneously responsive to normal deenergization of the power system load for deactivating the power switch voltage sensing means instantaneously upon initiation of deenergization of the power system load.

5. A protective system according to claim 4 also comprising means responsive to normal initial energization of the protective system for delaying operation of the protective system for delaying operation of the deactivating means for a preselected momentary period of time, and loading transient suppression means responsive to the output voltage of the power switching means for deactivating the operation of the deactivating means momentarily over a period of several cycles of operation after the occurrence of a transient pulse of a preselected polarity in the power system.

6. A protective system according to claim 1 wherein said semiconductor power switching means is a power transistor switching circuit, said power system comprises means for reverse biasing said switching circuit when said switching circut is turned off, and said detection means is responsive to the input voltage of said switching circuit when said switching circuit is turned on to produce a failure signal when said input voltage is below a preselected level at a polarity to forward bias said switching circuit and said detection means is also responsive to said input voltage when said switching circuit is turned off to produce a failure signal when said input voltage during the off condition is below a preselected level at a polarity to reverse bias said switching circuit.

7. A protective system according to claim 6 also comprising deenergization sensing means responsive to the normal operational deenergization state of the power system load for deactivating the voltage sensing means during said normal deenergization, and interlock means instantaneously responsive to normal deenergizing of the power system load for deactivating the voltage sensing means instantaneously upon initiation of deenergization of the power system load.

8. A protective system according to claim 6 also comprising means responsive to normal initial energization of the protective system for delaying operation of the deactivating means for a preselected momentary period of time, and loading transient suppression means responsive to the output voltage of the power transistor switching circuit for deactivating the operation of the deactivating means momentarily over a period of several cycles of operation after the occurrence of a transient pulse of a preselected polarity in the power system.

9. A protective system according to claim 7 also comprising means responsive to the normal initial energization of the protective system for delaying operation of the deactivating means for a preselected momentary period of time, and loading transient suppression means responsive to the output voltage of the power transistor switching circuit for deactivating the operation of the deactivating means momentarily over a period of several cycles of operation after the occurrence of a transient pulse of a preselected polarity in the power system.

10. A protective system in accordance with claim 2 wherein said voltage sensing means produces a failure signal when both said input voltage and said output voltage are zero or positive and including means for reverse biasing said driver transistor and said power transistor when they are turned off.

References Cited

UNITED STATES PATENTS

| | | | |
|---|---|---|---|
| 3,349,309 | 10/1967 | Dannetell | 318—341 |
| 3,373,316 | 4/1968 | Palmer | 317—13 |
| 3,399,288 | 8/1968 | Schierholt | 317—31 |
| 3,413,520 | 11/1968 | Westbrook | 317—13 |

J. D. TRAMMELL, Primary Examiner

A. D. PELLINEN, Assistant Examiner

U.S. Cl. X.R.

317—33, 43, 49; 318—341